United States Patent [19]

Maruhashi et al.

[11] Patent Number: 4,551,366
[45] Date of Patent: Nov. 5, 1985

[54] COMPOSITE VESSEL EXCELLENT IN PRESERVABILITY AND PROCESS FOR PREPARATION THEREOF

[75] Inventors: Yoshitsugu Maruhashi, Yokohama; Sadao Hirata, Kamakura, both of Japan

[73] Assignee: Toyo Seikan Kaisha, Ltd., Tokyo, Japan

[21] Appl. No.: 454,612

[22] Filed: Dec. 30, 1982

[30] Foreign Application Priority Data

Jan. 11, 1982 [JP] Japan ............................. 57-1252[U]
Mar. 10, 1982 [JP] Japan ............................. 57-36512

[51] Int. Cl.4 ........................................... B32B 15/08
[52] U.S. Cl. ................................. 428/35; 229/1.5 B
[58] Field of Search ............... 229/1.5 B, 43; 428/35; 525/57, 58, 60, 179

[56] References Cited

U.S. PATENT DOCUMENTS

| | | | |
|---|---|---|---|
| 3,759,437 | 9/1973 | Amberg | 229/1.5 B |
| 3,936,334 | 2/1976 | Kushida et al. | 156/69 |
| 3,988,521 | 10/1976 | Fumel et al. | 229/1.5 B |
| 4,124,434 | 11/1978 | Wommelsdorf et al. | 229/1.5 B |
| 4,130,234 | 12/1978 | Schmidt | 229/1.5 B |
| 4,182,457 | 1/1980 | Yamada et al. | 229/1.5 B |
| 4,228,250 | 10/1980 | Pritchett | 525/57 |
| 4,247,584 | 1/1981 | Widiger et al. | 428/35 |
| 4,347,332 | 8/1982 | Odorzynski et al. | 524/169 |
| 4,366,288 | 12/1982 | Resz et al. | 525/60 |
| 4,500,677 | 2/1985 | Maruhashi et al. | 525/57 |

FOREIGN PATENT DOCUMENTS

156917 9/1982 Fed. Rep. of Germany .
45-31758 10/1970 Japan .

*Primary Examiner*—John E. Kittle
*Attorney, Agent, or Firm*—Sherman & Shalloway

[57] ABSTRACT

Disclosed is a function-separated composite vessel excellent in the easy openability, preservability and resistance to the deformation due to reduction of the pressure, which comprises a cup-shaped outer member composed of a paper substrate and a flexible seamless cup-shaped inner member composed of a gas-barrier plastic material, wherein the peripheral wall face of the inner member is substantially exactly fitted in the inner side of the outer member but is not bonded to the wall face of the outer member and an opening of the inner member is bonded to a curl portion or flange portion formed on an opening of the outer member.

17 Claims, 9 Drawing Figures

COMPOSITE VESSEL EXCELLENT IN PRESERVABILITY AND PROCESS FOR PREPARATION THEREOF

BACKGROUND OF THE INVENTION (1) Field of the Invention

The present invention relates to a function-separated composite vessel which is excellent in the preservability, shape-retaining property, easy openability and resistance to the deformation due to reduction of the pressure. More particularly, the present invention relates to a composite vessel comprising a cup-shaped outer member composed of a paper substrate and a flexible seamless cup-shaped inner member composed of a gas-barrier plastic material.

(2) Description of the Prior Art

Paper vessels are widely used as packaging vessels for preserving drinks and other liquid foods, because they have a good shape-retaining property and they can easily be disposed of by incineration or the like. A paper substrate has a very high gas permeability and a water permeability. Accordingly, there is widely adopted a method in which a paper substrate is combined with a material having an excellent gas-barrier property, such as an aluminum foil, and a film of a thermoplastic resin such as polyethylene is applied to the inner and outer surfaces of the laminate.

If the above-mentioned layer structure is adopted, permeation of gas and water through the vessel wall is effectively controlled, but the seam portion of the vessel of this type still involves a fatal defect as described below.

A paper vessel of the above-mentioned type ordinarily has a side seam formed by lap-bonding both the end portions of a sheet, and a cut edge of the paper sheet is inevitably located on the inner side of this side seam and permeation of gas or liquid from this cut edge is caused. A very troublesome operation of covering and protecting the cut edge located on the inner side of the seam is necessary for preventing the above undesirable phenomenon.

In a paper vessel of the above-mentioned type, when a content is hot-filled so as to improve the preservability, cavity deformation of the vessel wall is caused by reduction of the inner pressure due to decrease of the volume of the content and condensation of vapors.

SUMMARY OF THE INVENTION

The present invention provides a function-separated composite vessel which is quite different from a conventional paper-plastic composite vessel in the structure and functions.

It is a primary object of the present invention to provide a function-separated composite vessel which is excellent in the preservability, shape-retaining property, easy openability and resistance to the deformation due to reduction of the pressure.

Another object of the present invention is to provide a function-separated composite vessel which comprises an outer member of a paper substrate imparting a good shape-retaining property to the vessel as a whole and shows a high protective action to the vessel and a seamless cup-shaped inner member of a plastic material acting as a layer moderating the contraction of the volume and in which a lid can be opened very easily.

Still another object of the present invention is to provide a function-separated composite vessel comprising an inner member of a paper substrate such as mentioned above and a seamless flexible inner member of a plastic material (often referred to as "inner pouch" hereinafter) excellent in the gas-barrier property and pinholding resistance, which is located on the inner side of the outer member.

A further object of the present invention is to provide a paper-plastic composite vessel having a high resistance to the deformation due to reduction of the pressure, in which the content can be preserved for a long time in a sealed state with no deterioration without using particular means such as refrigeration or freezing and even when a content is hot-filled, deformation of the appearance of the vessel is not caused.

A still further object of the present invention is to provide a process for the preparation of a paper-plastic composite vessel in which the seam of a paper sheet need not be covered or protected and the preparation operations are very simple.

More specifically, in accordance with the present invention, there is provided a function-separated composite vessel excellent in the easy openability, preservability and resistance to the deformation due to reduction of the pressure, which comprises a cup-shaped outer member composed of a paper substrate and a flexible seamless cup-shaped inner member composed of a gas-barrier plastic material, wherein the peripheral wall face of the inner member is substantially exactly fitted in the inner side of the outer member but is not bonded to the wall face of the outer member and an opening of the inner member is bonded to a curl portion or flange portion formed on an opening of the outer member.

In this composite vessel, the seamless cup-shaped inner member is formed by the plug-assist forming using the cup-shaped outer member as a female mold, and the seamless cup-shaped inner member is preferably formed from a film or sheet having a layer of a blend comprising an ethylene-vinyl alcohol copolymer and a polyamide at a weight ratio of from 95/5 to 5/95. Furthermore, the inner member is draw-formed so that the draw ratio H/D defined as the ratio of the height H of the inner member to the size D of the opening of the inner member is at least 0.5, and the wall of the cup-shaped inner member is molecularly oriented.

BRIEF DESCRIPTION OF THE DRAWINGS

FIGS. 2-A and 2-B are arrangement diagrams showing the operation of forming a seamless cup-shaped inner member.

DETAILED DESCRIPTION OF THE PREFERRED EMBODIMENTS

The present invention will now be described in detail with reference to embodiments illustrated in the accompanying drawings.

Figure 1:
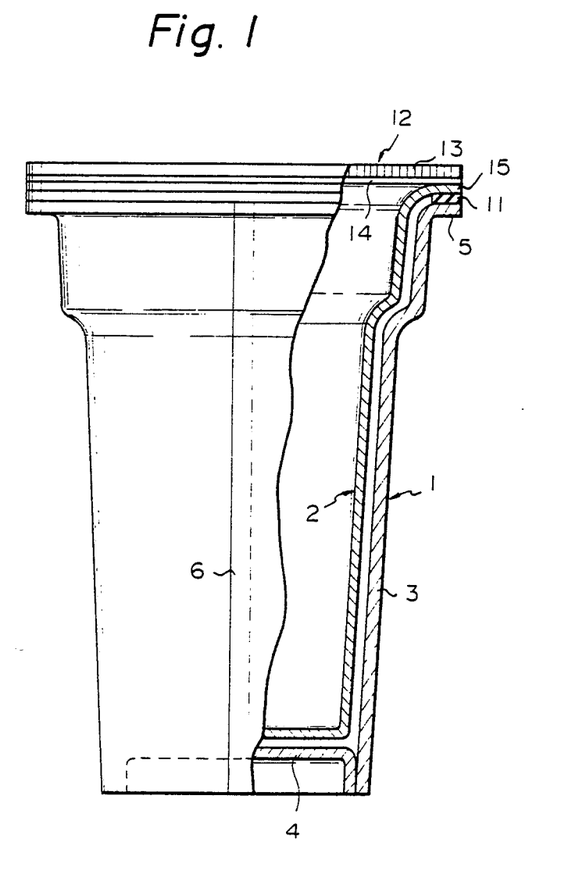
FIG. 1 is a partially sectional front view illustrating an embodiment of the composite vessel of the present invention.

The entire structure of one embodiment of the composite vessel of the present invention is illustrated in FIG. 1. This composite vessel comprises a cup-shaped outer member 1 composed of a paper substrate and a flexible seamless cup-shaped inner member (inner pouch) 2 formed from a gas-barrier plastic material. This cup-shaped outer member 1 comprises a barrel portion 3 formed by curving a paper substrate sheet into a circle and lap-bonding both the end portions of the sheet through an adhesive layer, a bottom portion 4 bonded to the lower end of the barrel portion 3 and a curl or flange portion 5 formed by bending the paper substrate on an upper end opening of the barrel portion 3. A seam 6 is formed on the side face of the barrel portion 3 by the above-mentioned lap bonding (lap seaming). The cup-shaped outer member 1 is composed of a cup paper to which a water resistance is given by incorporation of a sizing agent or an acid resistance is given by incorporation of an acid-resisting agent. It is ordinarily preferred so as to improve the preservability of a paper cup and the shape-retaining property in the wet state that the surface of the paper substrate be coated with a wax or resin, though this coating operation is not indispensably necessary. Furthermore, in order to enhance the shape-retaining property, a metal foil such as an aluminum foil may be bonded to the side of the paper substrate to be formed into the inner face of a cup, or this side of the paper substrate may be coated with a paint comprising a flaky metal powder pigment such as an aluminum flake.

Figure 2:
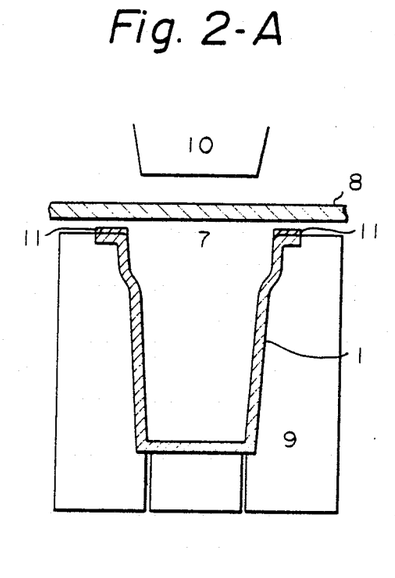
Figure 3:
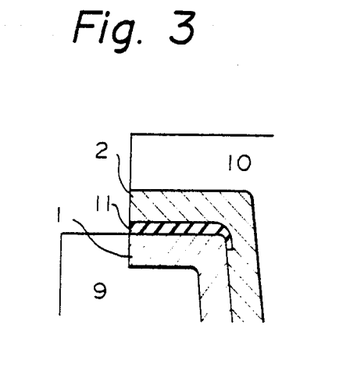
FIG. 3 is an enlarged sectional view illustrating a curl portion or flange portion shown in FIG. 2-B.

In the present invention, as shown in FIGS. 2-A and 2-B, the seamless inner member 2 is formed by supplying a film or sheet 8 of a gas-barrier plastic material to an opening 7 of the cup-shaped outer member 1 (see FIG. 2-A) and subjecting the film or sheet 8 to the plug-assist forming by pressing the film or sheet 8 by a plug 10 in the state where the cup-shaped outer member 1 is held by an auxiliary female mole 9 (see FIG. 2-B). The plastic film or sheet 8 is pre-heated at a molding-possible temperature, that is, a stretching-possible temperature, in advance, and as is shown in the enlarged sectional view of FIG. 3, an adhesive layer 11 of a hot-melt adhesive or the like is preliminarily applied to the curl portion or flange portion 5 of the cup-shaped outer member 1.

By this plug-assist forming, the plastic film or sheet 8 is formed into a seamless cup 2 having the same shape as that of the cup-shaped outer member 1 which has been used as the female mold. Accordingly, the peripheral wall face of the inner cup 2 is substantially exactly fitted in the inner side of the outer cup 1 but is not bonded to the wall face of the outer cup 1, and in this state, the opening of the inner cup 2 is bonded to the curl portion or flange portion 5 of the outer cup 1 through the adhesive layer 11.

Referring to FIG. 1 again, a lid indicated as a whole by reference numeral 12 is applied to the opening of the composite vessel comprising the outer cup 1 and the inner cup 2, which are combined in the above-mentioned manner. This lid comprises a substrate 13 composed of a metal coil, a plastic film or a laminate thereof and a heat sealant layer 14 applied to the surface, on the vessel side, of the substrate 13. Sealing is effected by heat-fusion-bonding this heat sealant layer 14 to the end portion 15 of the opening of the inner cup 2 on the curl portion or flange portion 5.

Incidentally, to easily discharge air in the outer cup 1 to the outside at the time of forming the inner cup 2, it is preferred that at least a part of the outer cup 1, especially the bottom portion 4, be formed of a paper sheet having an air permeability.

In the composite vessel of the present invention, since the cup-shaped outer member 1 composed of a paper substrate and the cup-shaped inner member 2 composed of a gas-barrier plastic material are formed in the above-mentioned positional relationship, even if the inner member 2 is as thin as a plastics pouch, a sufficient shape-retaining property and a good protecting effect can be obtained by the outer member 1 composed of a paper substrate. Furthermore, although the outer member 1 is composed of a gas-permeable paper substrate, an excellent gas-barrier property and hence, a good content preservability can be obtained by dint of the gas-barrier plastic material constituting the inner member 2. Moreover, since the inner member 2 composed of a plastic material is formed by the plug-assist forming using the outer member 1 composed of a paper substrate as the female mold, the inner member 2 is exactly fitted in the outer member 1, and therefore, the inner volume of the composite vessel is substantially equal to the inner volume of the outer cup 1 and when the lid is opened, a good feel or appearance is maintained on the inner face side. Still further, in the present invention, since the plastic cup-shaped inner member 2 is bonded to the paper cup-shaped outer member 1 only at the curl portion or flange portion 5 through the adhesive layer 11 and the peripheral wall face of the inner member 2 is kept in the substantially non-bonded state, even if reduction of the volume of the content and condensation of vapors are caused after hot filling of the content and sealing of the lid to the composite vessel, this flexible plastic inner member 2 acts as a layer moderating the difference between the inner and outer pressures and thus prevents deformation of the outer side of the vessel, with the result that the appearance of the packaged vessel is not degraded and reduction of the commercial value is not caused. Moreover, when the lid is peeled off and opened, the risk of raising of the plastic inner member 2 is eliminated.

From the viewpoint of the shape-retaining property, a cup paper having a basis weight of 50 to 400 g/m² is preferred as the paper substrate of the cup-shaped outer member, and it is preferred that the unit weight of the cup-shaped inner member 2 be 0.001 to 0.5 g per ml of the inner volume. Even when the unit weight of the cup-shaped inner member 2 is as small as 0.001 to 0.1 g/ml, an excellent shape-retaining property and a high content preservability can be obtained in the present invention, and prominent functional effects can be attained with respect to reduction of the weight of the vessel, reduction of the manufacturing cost and easiness of the disposal treatment.

Figure 4:
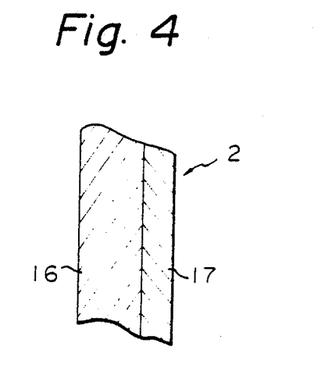
FIG. 4 is an enlarged sectional view illustrating the sectional structure of the inner member.

As the gas-barrier plastic material, there can be mentioned ethylene-vinyl alcohol copolymers, various polyamides, vinylidene chloride copolymers, vinyl chloride resins and high-nitrile resins. These plastic materials may be used singly or in the form of a mixture of two or more of them. The plastic cup-shaped inner member may be composed of a single-layer film, but in view of the moldability of gas-barrier property, it is preferred that the inner member be composed of a laminate film, especially a structure shown in the sectional view of FIG. 4, which comprises a substrate 16 composed of a polyolefin such as polyethylene, polypropylene, an ethylene-propylene copolymer or a blend thereof and a layer 17 of an oxygen-barrier resin such as a vinylidene chloride copolymer or the like, which is formed on the substrate 16 by coating or lamination.

It is preferred that forming of the film or sheet into a cup be carried out at a temperature in the range of from (Tm−40° C.) to (Tm+50° C.) in which Tm stands for the melting point of the plastic material constituting the film or sheet.

As the adhesive for bonding the opening of the paper cup to the plastic cup, a hot-melt adhesive which is heat-bondable at a temperature adopted for forming the film or sheet into a cup is preferably used. As preferred examples of the hot-melt adhesive, there can be mentioned acid- and acid anhydride-modified olefin resins obtained by graft-copolymerizing ethylenically unsaturated carboxylic acids or anhydrides thereof, such as acrylic acid, methacrylic acid, fumaric acid, maleic acid, maleic anhydride, itaconic acid, citraconic acid and citraconic anhydride, to polyolefins such as polyethylene, polypropylene, ethylene-propylene copolymers and ethylene-vinyl acetate copolymers. Such acid- or acid anhydride-modified olefin resin may be used singly or in the state diluted with an unmodified olefin resin. It is preferred that the final carbonyl group concentration be 10 to 1400 meq/100 g of the resin. An aqueous emulsion of the above-mentioned acid- or acid anhydride-modified olefin resin may be used as the adhesive. As another example of the hot-melt adhesive, there can be mentioned a hot-melt composition comprising a blend of an olefin resin base such as low density polyethylene or an ethylene-vinyl acetate copolymer and a tackifier such as polystyrene, a styrene copolymer or a petroleum resin.

In the present invention, since the film or sheet supplied to the opening of the outer cup is deep-drawn to the bottom of the outer cup, it is preferred that the film or sheet be excellent in the deep drawability. We found that a laminate film or sheet formed by laminating or coating a gas-barrier resin layer on a substrate composed of an olefin resin blend comprising crystalline polypropylene and polyethylene at a weight ratio of from 90/10 to 5/95 is especially suitable for the above purpose. When this film or sheet is draw-formed at a temperature higher than the melting point of polyethylene but lower than the melting point of polypropylene, a prominent stretchability can be attained and an inner cup having a molecular orientation effect and being free of pinholes or cracks can easily be obtained.

When the inner face layer of the plastic cup 2 is formed from the above-mentioned blend of polyethylene and polypropylene, an advantage can be attained with respect to the easy openability in addition to the improvement of the stretchability. More specifically, this blend layer forms an easily peelable adhesive interface between polyethylene or polypropylene and the heat sealant layer of the lid, and opening by peeling of the lid can be accomplished very easily.

In accordance with an especially preferred embodiment of the present invention, the seamless cup-shaped inner member 2 is formed by draw-forming a sheet having a layer of a blend comprising an ethylene-vinyl alcohol copolymer and a polyamide at a weight ratio of from 95/5 to 5/95, especially from 80/20 to 5/95, so that the draw ratio H/D defined as the ratio of the height H of the inner member 2 to the size D of the opening of the inner member 2 is at least 0.5, preferably at least 0.7, whereby molecular orientation is given to the cup wall of the inner member 2.

Among various thermoplastic resins, an ethylene-vinyl alcohol copolymer, that is, a saponified ethylene-vinyl ester copolymer, is one of resins having a highest oxygen-barrier property. However, this copolymer is defective in that the elongation is low and the processability is poor. Therefore, draw-forming of this copolymer is very difficult under such conditions that molecular orientation is caused in the resin layer, and if draw-forming is forcibly carried out, pinholes or cracks are formed, resulting in the loss of the gas-barrier property. In case of a paper cup vessel, the draw ratio H/D is high, and therefore, it is extremely difficult to draw-form a sheet of the above-mentioned copolymer into an inner member which is exactly fitted in the paper cup as the outer member.

In the present invention, this disadvantage is overcome by utilizing the fact that a blend comprising the ethylene-vinyl alcohol copolymer and polyamide at the above-mentioned weight ratio has a prominently excellent draw-moldability and a prominently high oxygen-barrier property. More specifically, the present invention is characterized in that this blend layer is draw-formed at a high draw ratio to obtain a seamless cup having a size exactly fitted in the cup-shaped outer member, in which the wall face is molecularly oriented.

In the present invention, as the ethylene-vinyl alcohol copolymer, there is used an ethylene-vinyl ester copolymer having an ethylene content of 20 to 60 mole %, especially 25 to 50 mole %, and a saponification degree of at least 90%, especially at least 95%. This ethylene-vinyl alcohol copolymer may comprise as the comonomer other olefin such as propylene, butene-1, pentene-1 or 4-methylpentene-1 in such an amount as not changing the inherent properties of the copolymer, that is, in an amount of up to 5 mole % based on the total copolymer.

In the present invention, ethylene-vinyl alcohol copolymers of the above-mentioned type may be used singly or in the form of a mixture of two or more of them. In the present invention, it is especially preferred that (A) a saponified ethylene-vinyl ester copolymer having an ethylene content of 20 to 55 mole %, especially 25 to 50 mole %, and a saponification degree of at least 95% and (B) a saponified ethylene-vinyl ester copolymer having an ethylene content of 25 to 60 mole %, especially 30 to 55 mole %, and a saponification degree of at least 90%, in which the ethylene content is higher by at least 3 mole %, especially at least 5 mole %, than the ethylene content of the saponified ethylene-vinyl ester copolymer (A), be combined at a weight ratio of from 90/10 to 10/90, especially from 80/20 to 20/80, and the mixture be used as the ethylene-vinyl alcohol copolymer.

Figure 5:
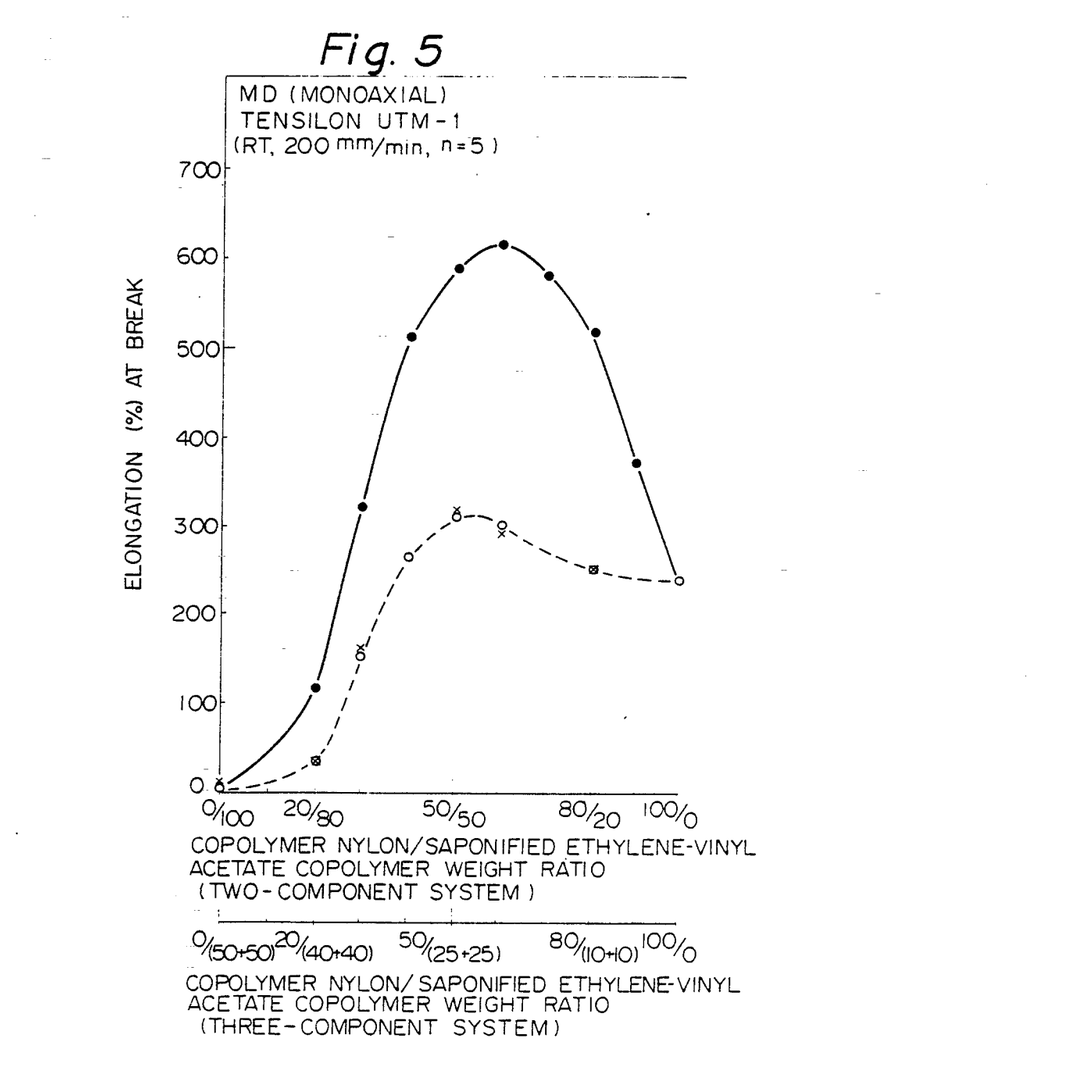
FIGS. 5 and 6 are graphs showing elongations at break of films of blends of a saponified ethylene-vinyl acetate copolymer and a copolymer nylon differing in the composition in both the machine direction (MD) and the transverse direction (TD) (as measured at room temperature at a speed of 200 mm/min by using Tensilon UTM-1 with the sample number n being 5).
Figure 6:
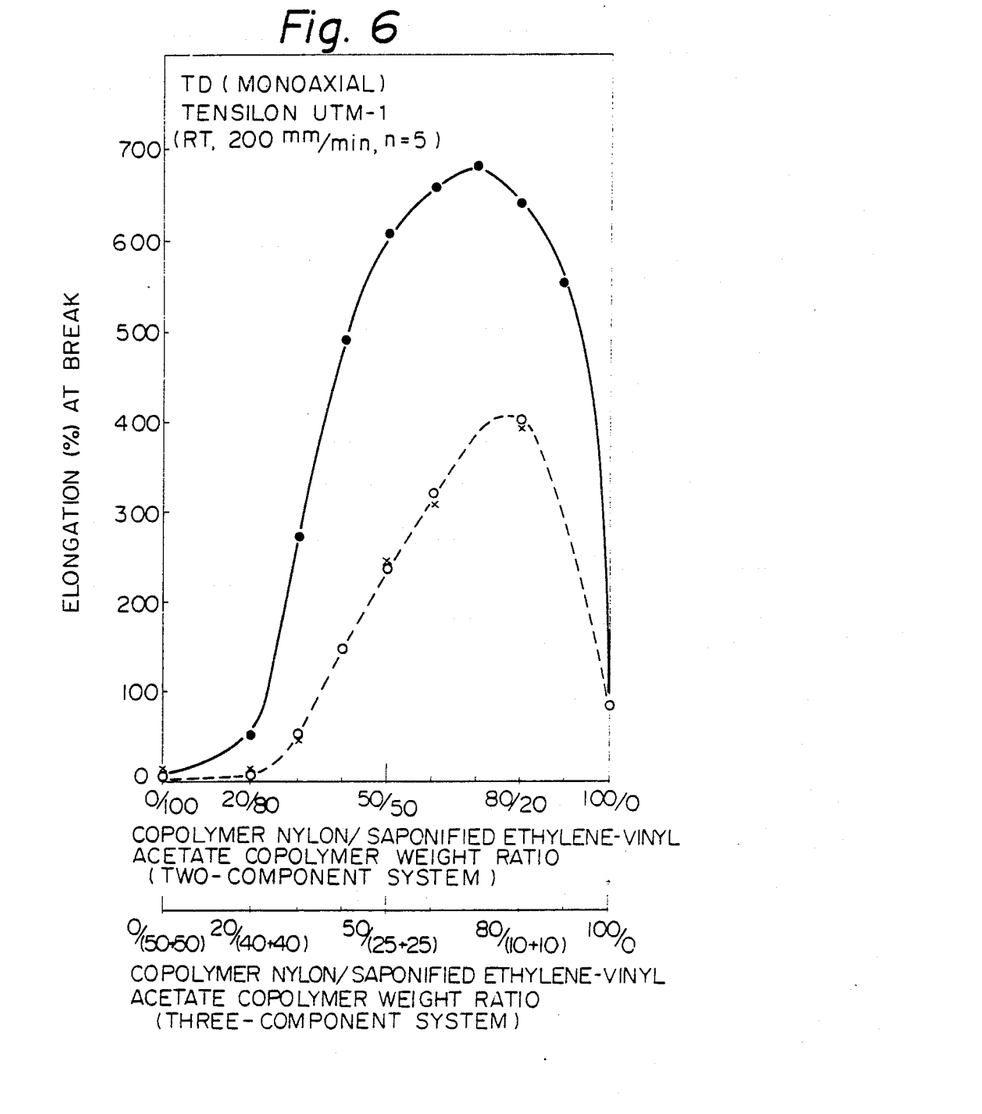

FIGS. 5 and 6 show elongations at break of films in the machine direction (MD) and the transverse direction (TD), which are observed when the mixing ratio between a saponified ethylene-vinyl acetate copolymer and a copolymer nylon are changed in Example. From these Figs., it will readily be understood that in the case where the saponified ethylene-vinyl acetate copolymer alone is used, the film shows only a very small elongation but if the copolymer nylon is blended in this copolymer, the elongation at break is increased to 300 to 400% at highest. This tendency of increase of the elongation is not different at all between the case of a saponified ethylene-vinyl acetate copolymer having an ethylene content of 30 mole % and a saponification degree of 99% (mark "○") and the case of a saponified ethylene-vinyl acetate copolymer having an ethylene content of 41 mole % and a saponification degree of 98% (mark "X").

Furthermore, if a saponified ethylene-vinyl acetate copolymer having a low ethylene content and a saponified ethylene-vinyl acetate copolymer having a high ethylene content are combined at a weight ratio of 50/50 and a copolymer nylon is blended into this composition, as is seen from curves of mark "●" in FIGS. 5 and 6, the elongation at break is increased to a level about 2 times as high as the elongation at break observed when the copolymer nylon is blended into the single saponified ethylene-vinyl acetate copolymer.

The reason why the draw-moldability is improved by blending an ethylene-vinyl alcohol copolymer and a polyamide at a certain weight ratio and the reason why the elongation is prominently increased by blending a polyamide into a combination of a plurality of saponified ethylene-vinyl ester copolymers differing in the ethylene content have not been elucidated. However, it is believed that since the compatibility of the polymers is very good in the above-mentioned polymer combination, one of the reasons may be that a plasticity will be given to the above-mentioned blend at the time of stretching.

A saponified copolymer having an ethylene content lower than 20 mole % is not suitable for attaining the objects of the present invention, because this copolymer is poor in the heat moldability, lacks the thermal stability and has a humidity sensitivity. A saponified copolymer having an ethylene content higher than 60 mole % is much inferior in the barrier property to gases such as oxygen to a saponified copolymer having an ethylene content within the range specified in the present invention and the compatibility of this copolymer with a polyamide is reduced. In case of a combination of a plurality of saponified ethylene-vinyl ester copolymers in which the difference of the ethylene content is smaller than 3 mole %, prominent increase of the elongation cannot be expected when a polyamide is blended in this combination.

The gas-barrier property of the saponified ethylene-vinyl ester copolymer is greatly influenced by the saponification degree. In the saponified copolymer (A) having a low ethylene content, the saponification degree should be at least 95%, and in the saponified copolymer (B) having a high ethylene content, the saponification degree may be at least 90%.

The molecular weight of this saponified ethylene-vinyl ester copolymer (ethylene-vinyl alcohol copolymer) is not particularly critical, and it is sufficient if it has a film-forming molecular weight. The inherent viscosity $[\eta]$ of the ethylene-vinyl alcohol copolymer is measured, for example, in a mixed solvent comprising 85% by weight of phenol and 15% by weight of water at 30° C. In the present invention, it is preferred that an ethylene-vinyl alcohol copolymer having an inherent viscosity $[\eta]$ of 0.07 to 0.17 l/g as measured according to the above-mentioned method be used.

A high-molecular-weight linear polyamide is used as the polyamide to be combined with the saponified ethylene-vinyl ester copolymer. This polyamide may be a homopolyamide, a copolyamide or a blend thereof. For example, there can be mentioned homopolyamides or copolyamides having the following amide recurring units or blends thereof:

wherein R, $R^1$ and $R^2$ stand for a linear alkylene group.

From the viewpoint of the barrier property to oxygen, carbon dioxide gas and the like, it is preferred that a homopolyamide or copolyamide having 4 to 30 amide groups, especially 6 to 25 amide groups, per 100 carbon atoms in the polyamide or a blend thereof be used. As preferred examples of the homopolyamide, there can be mentioned polycapramide (nylon 6), poly-ω-aminoheptanoic acid (nylon 7), poly-ω-aminononanoic acid (nylon 9), polyundecamide (nylon 11), polylauryllactam (nylon 12), polyethylene diamine adipamide (nylon 2,6), polytetramethylene adipamide (nylon 4,6), polyhexamethylene adipamide (nylon 6,6), polyhexamethylene sebacamide (nylon 6,10), polyhexamethylene dodecamide (nylon 6,12), polyoctamethylene adipamide (nylon 8,6), polydecamethylene adipamide (nylon 10,6) and polydecamethylene sebacamide (nylon 10,8).

As preferred examples of the copolyamide, there can be mentioned a caprolactam/lauryl lactam copolymer, a caprolactam/hexamethylene diammonium adipate copolymer, a lauryl lactam/hexamethylene diammonium adipate copolymer, a hexamethylene diammonium adipate/hexamethylene diammonium sebacate copolymer, an ethylene diammonium adipate/hexamethylene diammonium adipate copolymer and a caprolactam/hexamethylene diammonium adipate/hexamethylene diammonium sebacate copolymer.

These homopolyamides and copolyamides may be used in the form of so-called blends. For example, a blend of polycaprolactam and polyhexamethylene adipamide and a blend of polycaprolactam and a caprolactam/hexamethylene diammonium adipate copolymer may be used for attaining the objects of the present invention.

From the viewpoint of the draw-moldability, it is important that the polyamide that is used in the present invention should have a compatibility with the ethylene-vinyl alcohol copolymer. This compatibility depends on both the number of amide groups in the polymer chain of the polyamide and the melting point of the polyamide. More specifically, a polyamide having too low an amide group concentration or too high an amide group concentration has a low compatibility with the ethylene-vinyl alcohol copolymer, and therefore, a polyamide having an amide group concentration within the above-mentioned range should be used. The melting point of the polyamide is ordinarily higher than that of the ethylene-vinyl alcohol copolymer, but it is necessary to use a polyamide having such a melting point that the difference between the melting point of the polyamide and the melting point of the ethylene-vinyl alcohol copolymer is smaller than 100° C., especially smaller than 65°.

In view of the foregoing, it is preferred to use a copolyamide comprising nylon 6 and nylon 6,6, especially a copolyamide comprising nylon 6 and nylon 6,6 at a weight ratio of from 99/1 to 70/30, particularly from 97/3 to 80/20, as the polyamide.

The molecular weight of the polyamide is not particularly critical, and it is sufficient if the polyamide has a film-forming molecular weight. However, it is ordinarily preferred that the relative viscosity ($\eta_{rel}$) of the polyamide be 1.2 to 6.0 as determined at 20° C. with respect to a solution of 1 g of the polymer in 100 cc of 98% sulfuric acid. If the polyamide has a relative viscosity lower than 1.2, when the polyamide is combined with the saponified copolymer and subjected to draw molding such as plug-assist forming, it is often difficult to obtain a molded article excellent in the mechanical strength. If the relative viscosity is higher than 6.0, the polyamide is ordinarily inferior in the melt-forming property.

From the viewpoint of the draw-moldability, it is important in the present invention that the saponified copolymer and the polyamide should be used at a weight ratio of from 95/5 to 5/95, especially 80/20 to 5/95. If the amount of the polyamide is too large and exceeds the above range or if the amount of the saponified copolymer is too large and exceeds the above range, the draw-moldability tends to be degraded.

In the above-mentioned preferred embodiment of the present invention, it is important that the saponified copolymer (A) having a low ethylene content and the saponified copolymer (B) having a high ethylene content should be combined at an (A)/(B) weight ratio of from 90/10 to 10/90, especially from 80/20 to 20/80. If this weight ratio is outside the above-mentioned range, the stretchability of the final resin composition tends to be reduced. Furthermore, if the proportion of the copolymer having a high ethylene content is increased, the gas-barrier property is ordinarily reduced. Accordingly, in order to obtain an optimum combination of the draw-moldability and the gas-barrier property, it is preferred that both the saponified copolymers be used in substantially equal amounts.

The blending method for formation of the above-mentioned two-component or three-component resin composition is not particularly critical. For example, a molding resin composition can easily be obtained by melt blending or dry blending. In order to prevent thermal deterioration, dry blending is preferred, and the dry blend (compound) is supplied to a molding extruder or injection molding machine and is kneaded by a screw in the extruder or injection molding machine.

Known additives such as antioxidants, antistatic agents, lubricants, ultraviolet absorbers, coloring materials, fillers and plasticizers may be incorporated in the above-mentioned resin composition to be used in the present invention according to the known recipes.

Figure 7:
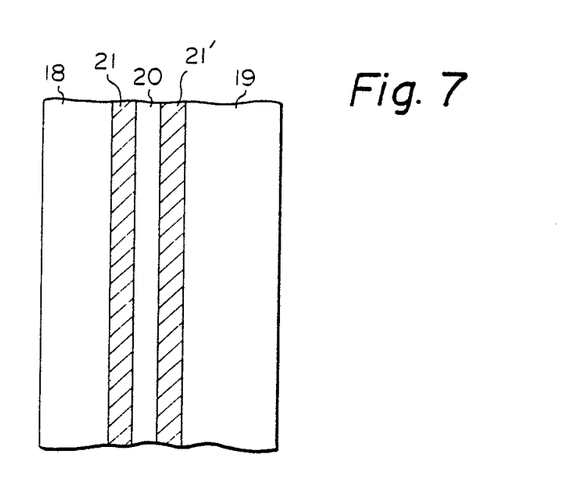
FIGS. 7 and 8 are sectional views showing two examples of the layer structure of the cup-shaped inner member.

Referring to FIG. 7 illustrating the section of a preferred example of the inner member 2 of the present invention, this inner member 2 comprises an inner surface layer 18 composed of a polyolefin, an outer surface layer 19 composed of a polyolefin and an intermediate layer 20 composed of the above-mentioned blend, and thermoplastic adhesive layers 21 and 21' may be formed between the intermediate layer and the inner surface layer and between the intermediate layer and the outer surface layer, respectively, according to need.

The gas-barrier property of the blend layer depends on the humidity, and the blend layer is defective in that the barrier property is reduced as the humidity is elevated. However, if the above-mentioned multi-layer structure is adopted, this defect is eliminated. As the polyolefin, there can be used low density polyethylene, medium density polyethylene, high density polyethylene, isotactic (crystalline) polypropylene, a crystalline ethylene-propylene copolymer, an ethylene-vinyl acetate copolymer, an ion-crosslinked olefin copolymer and a blend thereof. In this preferred embodiment of the present invention, it is preferred that a polyolefin blend comprising crystalline polypropylene and polyethylene at a weight ratio of from 90/10 to 5/95, especially from 75/25 to 20/80, be used as the polyolefin. If a polyolefin alone is draw-formed at such a high draw ratio as mentioned above, pinholes or cracks are readily formed, but if the above-mentioned blend is used, formation of pinholes or other defects in the polyolefin layer can be prevented effectively.

If the blend layer 20 is sufficiently thick, the polyolefin outer surface layer 19 and the thermoplastic adhesive layer 21' may be omitted.

An acid- or acid anhydride-modified olefin resin formed by graft-copolymerizing, for example, an ethylenically unsaturated carboxylic acid or its anhydride such as acrylic acid, methacrylic acid, fumaric acid, maleic acid, maleic anhydride, itaconic acid, citraconic acid or citraconic anhydride to a polyolefin such as polyethylene, polypropylene, an ethylene-propylene copolymer or an ethylene-vinyl acetate copolymer is used for the thermoplastic adhesive layers 21 and 21'. This acid- or acid anhydride-modified olefin resin may be used singly or in the state diluted with an unmodified olefin resin. It is preferred that the final carbonyl group concentration be 10 to 800 meq/100 g of the resin.

Figure 8:
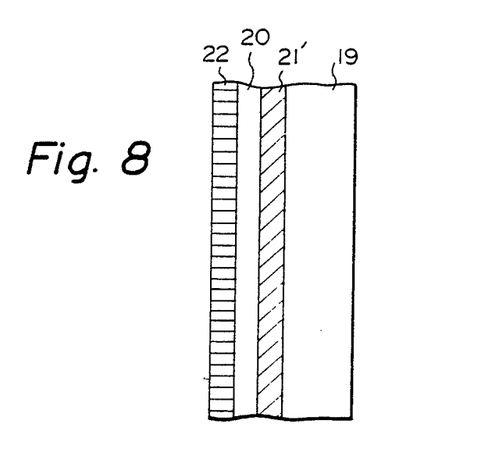

In accordance with still another preferred embodiment of the present invention, the cup-shaped inner member is formed from a laminate comprising the above-mentioned blend layer and a coating layer of a vinylidene chloride resin. Referring to FIG. 8 illustrating this embodiment, a polyolefin layer 19 is formed on the outer side of the above-mentioned blend layer 20 through a thermoplastic adhesive layer 21', and a coating layer 22 of a vinylidene chloride resin is formed on the inner side of the blend layer 20. The cup-shaped inner member 2 of this type is excellent in the property of retaining the aroma, flavor and taste of the content and the gas-barrier property.

As the vinylidene chloride resin of the coating layer 22, there is preferably used a copolymer comprising 99 to 70% by weight of vinylidene chloride and 1 to 30% by weight of at least one monomer selected from acrylic and methacrylic monomers and further containing at least one other ethylenically unsaturated monomer in an amount of up to 100 parts by weight per 100 parts by weight of the sum of the above monomers, said copolymer having an oxygen permeation coefficient smaller than $9 \times 10^{-14}$ cc.cm/cm$^2$.sec.cmHg as measured at a temperature of 20° C. and a relative humidity of 100% and a water vapor permeation coefficient (JIS Z-0208) smaller than $3 \times 10^3$ g.cm/m$^2$.day. The above-mentioned polyolefin layer and adhesive layer may also be used in this embodiment.

Of course, the laminate of the above-mentioned blend is not limited to a laminate as described above. For example, a laminate of the above-mentioned blend with polyethylene terephthalate, polycarbonate, polystyrene, polyvinyl chloride, a methacrylic resin or poly-4-methylpentene-1 may be used for the formation of the inner member 2.

In this embodiment of the present invention, the draw-molding can be carried out at a temperature in the range of from (mp −20° C.) to (mp +40° C.), in which mp stands for the melting point of the component having a lowest melting point in the components of the above-mentioned blend, and the draw-molding can be accomplished with a good operation efficiency if the draw-molding temperature is in the range of from 135° to 160° C. and the draw ratio H/D is at least 0.5, especially at least 0.7.

As will be apparent from the foregoing description, according to the present invention, a deep-drawn cup 2 having a size substantially exactly fitted in the paper cup can easily be formed on the inner side of the paper cup 1. Since this inner cup member is highly draw-formed, the wall portion thereof is molecularly oriented, and this inner cup member is characterized in that in the portion 1 to 2 cm apart from the mouth of the vessel, the absolute value of at least one of the three-dimensional birefringences $\Delta x$, $\Delta y$ and $\Delta z$ is at least $0.1 \times 10^{-3}$.

The composite vessel of the present invention is especially valuable as a vessel to be used in the field where various contents are hot-filled or contents are sterilized outside the vessel.

The present invention will now be described in detail with reference to the following Examples that by no means limit the scope of the invention.

EXAMPLE 1

A caprolactam/hexamethylene diammonium adipate copolymer [6,66 copolymer nylon (N1)] having a relative viscosity of 3.3, a caprolactam concentration of 91 mole % and a melting point of 193° C. as measured by the differential thermal analysis method at a temperature-elevating rate of 10° C./min (hereinafter referred to as "DTA method") was mixed at room temperature for 10 minutes by a Henschel dry blender with a 50/50 weight ratio dry blend of an ethylene-vinyl alcohol copolymer (A) having an ethylene content of 30 mole %, a saponification degree of 99%, a vinyl alcohol content of 69 mole %, an inherent viscosity of 0.12 l/g and a melting point of 182° C. as measured according to the DTA method and an ethylene-vinyl alcohol copolymer (B1) having an ethylene content of 41 mole %, a saponification degree of 98%, a vinyl alcohol content of 57 mole %, an inherent viscosity of 0.10 g/l and a melting point of 164° C. as determined according to the DTA method. The copolymer nylon/dry blend mixing weight ratio was changed in the range of from 20/80 to 90/10.

For comparison, two-component mixtures comprising the copolymer nylon (N1) and the ethylene-vinyl alcohol copolymer (A) or (B1) at a weight ratio in the range of from 20/80 to 80/20 were prepared according to the above-mentioned method.

Each of the above-mentioned mixtures, the copolymer nylon (N1) alone, the ethylene-vinyl alcohol copolymer (A) alone and the ethylene-vinyl alcohol copolymer (B1) alone was molded through a T-die into a sheet having a width of 150 mm and a thickness of 0.5 mm by using an extruder having a diameter of 50 mm and an effective length of 1100 mm.

With respect to each of the so-obtained sheets, elongations at break [(length at break/initial length)×100, unit=%] in the machine direction (extrusion direction, MD) and the transverse direction (TD) were measured by a tensile tester (Tensilon UTM-1 supplied by Toyo-Baldwin) at room temperature and a pulling speed of 200 mm/min. The initial length of each sample was 5.0 cm. The relation between the elongation at break in the machine direction (extrusion direction, MD) and the mixing ratio in each mixture is shown in FIG. 5 and the same relation determined in the transverse direction (TD) is shown in FIG. 6. In each sheet, five samples were tested and the arithmetic mean of the obtained data is shown. In the samples of each sheet, the relative error was within 5%.

From FIGS. 5 and 6, it will readily be understood that the elongations at break of the two-component and three-component mixtures were apparently higher than the elongations at break of the respective single resins, and that the elongations at break of the three-component mixtures were prominently higher than those of the two-component mixtures.

A cylindrical cup-shaped outer member composed of a cup paper having a basis weight of 222 g/m² and a thickness of 0.275 mm, which had an opening inner diameter (D) of 70 mm and a total height (H) of 50 mm (H/D=0.71) and a curl portion formed on the opening was set in a mold, and a hot-melt adhesive (Esdin #8909 supplied by Sekisui-Esdin K.K.) was melt-extruded at 180° C. only onto the curl portion by using an applicator supplied by Nordson Co., USA., to coat the curl portion with the adhesive.

Among the foregoing sheets, the sheet of the two-component mixture comprising N1 and A at a weight ratio of 50/50, the sheet of the two-component mixture comprising N1 and B1 at a weight ratio and the sheet of the three-component mixture comprising N1, A and B1 at an N1/(A+B1) weight ratio of 50/(25+25) were chosen, and for comparison, the sheet of B1 alone, the sheet of N1 alone and a commercially available undrawn single-layer sheet of polyethylene terephthalate (having a thickness of 0.5 mm; hereinafter referred to as "PET") were chosen. Each of the foregoing 6 sheets was heated at a thermolabel temperature of 143° to 148° C. for 10 seconds by an infrared ray heater, and each sheet was forced into the mold in which the cup-shaped outer member (female mold) had been set and the plug-assist vacuum pressure forming was carried out. Simultaneously, the sheet was bonded to the cup-shaped outer member by means of the above-mentioned adhesive applied to the curl portion. Thus, there were obtained 6 kinds of composite cups (the unit weight was 0.016 g/ml) comprising the paper cup as the outer member and an inner pouch of any of the above-mentioned sheets as the inner member, in which the inner pouch was bonded only to the curl portion of the opening of the paper cup.

Each of the so-obtained 6 composite cups was filled with 185 ml of a commercially available soybean oil packed in a 18-liter can, and the mouth portion of the composite cup was heat-sealed at 150° C. by an iron with a lid composed of a three-layer film comprising a heat-sealant layer (30μ in thickness) of a mixture comprising 90% by weight of an ethylene-vinyl acetate copolymer having a vinyl acetate content of 20% by weight and a melting point of 92° C. and 10% by weight a vinyl aromatic polymer (Arkon P supplied by Arakawa Kagaku Kogyo K.K.) having a hydrogenation ratio of 100%), an intermediate layer of low density polyethylene having a thickness of 15μ and an outer layer of an aluminum foil having a thickness of 30μ. Then, the composite cups were stored at 25° C. for 2 months in a room (in the bright place). After 2 months, in each cup, the shape-retaining property was excellent without deformation. However, in the composite cups in which the inner member was the inner pouch composed of N1 or B1 alone, leakage of the soybean oil was caused because of pinholes formed when the sheet was formed into the inner pouch by the plug-assist forming, and it was judged that these composite cups were not suitable as vessels. When the foregoing 6 composite cups were opened by peeling the heat-sealed lids, the opening could be accomplished very smoothly without dusting, and in each cup, no sealing material was left on the opening of the opened cup and each cup was found excellent in the easy openability.

With respect to each of the 4 composite cups exclusive of the 2 cups comprising the inner member of N1 or B1 alone, the peroxide value of the soybean oil stored at 25° C. for 2 months was measured according to the standard oil and fat analysis method (Japanese Oil Chemistry Association). The obtained results are shown in Table 1. With respect to each cup, three samples were tested and the average value was calculated and shown.

From the results shown in Table 1, it is seen that the peroxide value of the soybean oil stored in the composite cup comprising the inner pouch (inner member) formed from the PET sheet was apparently larger than those of the soybean oils stored in the composite cups comprising the inner pouch (inner member) formed from the two-component or three-component mixture, and that in the composite cup comprising the inner pouch of PET, oxidative deterioration of the soybean oil was advanced.

From the results shown in Table 1, it also is seen that the peroxide value of the soybean oil stored in the composite cup comprising the inner pouch of the three-component mixture was smaller than those of the soybean oils stored in the composite cups comprising the inner pouch of the two-component mixture and that the preservability of the composite cup comprising the inner member of the three-component mixture was highest.

TABLE 1

| Mixing Ratio [N1/(A + B1)] of Inner Member | Peroxide Value (meq/Kg) | Remarks |
|---|---|---|
| 100/(0 + 0) | not measured because of leakage | comparison |
| 50/(50 + 0) | 2.01 | present invention |
| 50/(25 + 25) | 1.04 | present invention |
| 50/(0 + 50) | 2.21 | present invention |
| 0/(0 + 100) | not measured because of leakage | comparison |
| PET | 10.29 | comparison |

Note
The initial peroxide value was 1.03 meq/Kg.

EXAMPLE 2

A polycapramide [nylon 6 (N2)] having a relative viscosity of 1.9 and a melting point of 219° C. as measured according to the DTA method was used instead of the 6,66 copolymer nylon used in Example 1, and the copolymers A and B1 used in Example 1 were used as the saponified ethylene-vinyl acetate copolymers. In the same manner as described in Example 1, 6 kinds of sheets having a thickness of 0.5 mm were prepared from two-component mixtures having N2/(A+B1) weight ratios of 50/(50+0) and 50/(0+50), respectively, three-component mixtures having N2/(A+B1) weight ratios of 50/(40+10), 50/(25+25) and 50/(10+40) and nylon 6 alone by using the same apparatus as used in Example 1.

The same cup paper was formed into cup-shaped outer members having the same shape and size as in Example 1, and 6 kinds of composite cups comprising the above-mentioned paper cup outer member and an inner pouch of any of the foregoing sheets, in which only the curl portion of the opening was bonded by the hot-melt adhesive used in Example 1, were formed in the same manner as described in Example 1.

In the same manner as described in Example 1, commercially available soybean oil was filled in these composite cups, the openings were sealed with lids and the filled cups were stored at 25° C. for 2 months, and the peroxide value of the stored soybean oil was measured according to the method described in Example 1. The obtained results are shown in Table 2.

TABLE 2

| Mixing Ratio [(N2/(A + B1)] in Inner member | Peroxide Value (meq/Kg) | Remarks |
|---|---|---|
| 100/(0 + 0) | above 50[(1)] | comparison |
| 50/(50 + 0) | 3.91 | present invention |
| 50/(40 + 10) | 1.82 | " |
| 50/(25 + 25) | 1.26 | " |
| 50/(10 + 40) | 1.79 | " |
| 50/(0 + 50) | 3.68 | " |

Note
[(1)]Leakage of the soybean oil from the vessel was observed.
[(2)]The initial peroxide value was 1.03 meq/Kg.

EXAMPLE 3

Five-layer sheets having a width of 200 mm and a total thickness of 0.5 mm were extrusion-molded through a 5-ply T-die by using an inner and outer layer extruder provided with a full-flighted screw having a diameter of 65 mm and an effective length of 1430 mm and also with a melt channel branched into two paths, an intermediate layer extruder provided with a full-flighted screw having a diameter of 50 mm and an effective length of 1100 mm and an adhesive layer extruder provided with a full-flighted screw having a diameter of 50 mm and an effective length of 1100 mm and also with a melt channel branched into two paths. A blend comprising isotactic polypropylene having a density of 0.910 g/cc (ASTM D-1505), a melt index of 1.6 g/10 min (ASTM D-1238) and a melting point of 165° C. measured according to the DTA method and high density polyethylene having a density of 0.942 g/cc, a melt index of 0.3 g/10 min and a melting point of 135° C. (DTA method) at a weight ratio of 30/70 was used for inner and outer layers, and maleic anhydride-modified linear low density polyethylene (Sholex ER603N supplied by Showa Denko K.K.) having a density of 0.925 g/cc, a melt index of 3.0 g/10 min and a melting point of 120° C. (DTA method) was used for the adhesive layers. For the intermediate layer, there were independently used a three-component mixture comprising the 6,66 copolymer nylon N1 and ethylene-vinyl alcohol copolymers A and B1 described in Example 1 at an N1/A/B1 weight ratio of 50/25/25, a two-component mixture comprising the copolymer nylon N1 and copolymer A at an N1/A weight ratio of 50/50, a two-component mixture comprising the copolymer nylon N1 and copolymer B1 at an N1/B1 weight ratio of 50/50, the copolymer nylon N1 alone, the copolymer A alone and the copolymer B1 alone. In each of the so-obtained 6 sheets, the outer layer/adhesive layer/intermediate layer/adhesive layer/inner layer thickness ratio was 45/2.5/5/2.5/45. For comparison, a single-layer sheet (having a thickness of 0.5 mm; hereinafter referred to as "PO") was prepared from the above-mentioned blend of polypropylene and high density polyethylene by using the inner and outer layer extruder alone.

A cylindrical cup-shaped outer member composed of a cup paper having a basis weight of 300 g/m² and a thickness of 0.323 mm, which had an opening diameter (D) of 65 mm and a total height (H) of 70 mm (H/D=1.08) and a curl portion formed on the opening, was set in a mold, and an aqueous emulsion (having a solid concentration of 30% by weight) of high density polyethylene having 3% by weight of maleic anhydride grafted thereto (having a melting point of 133° C.) was coated as an adhesive only on the curl portion by using an applicator supplied by Nordson Co., USA.

Each of the foregoing 7 sheets was heated at a thermolabel temperature of 143° to 148° C. (138° to 143° C. only in case of the sheet of PO alone) for 10 seconds by an infrared ray heater and was forced into the mold in which the cup-shaped outer member (female mold) had been set, and the plug-assist vacuum pressure forming was carried out. Simultaneously, the emulsion coated on the curl portion was dried and bonded to the sheet. Thus, there were obtained composite cups (the unit weight was 0.038 g/ml) comprising the outer member of the above-mentioned cup paper and the inner member selected from the above-mentioned 6 kinds of the laminated (5-layer) inner pouches and the PO inner pouch, in which the inner pouch was bonded only to the curl part of the opening. The average thickness of the entire inner member was 0.15 mm. With respect to the composite cup (hereinafter referred to as "A") having the inner pouch prepared from the 5-layer sheet including the intermediate layer composed of the three-component mixture, the adhesion strength between the outer member and the inner member was measured at room temperature at the curl portion of the opening and the barrel wall portion by a tensile tester (at room temperature and a pulling speed of 200 mm/min). The obtained results are shown in Table 3.

For comparison, the aqueous emulsion of the above-mentioned maleic anhydride-grafted high density polyethylene was coated on the curl portion of the opening and the entire inner face of the cup-shaped outer member set in the mold, and according to the above-mentioned method, with the same conditions, material structures and thickness as described above, there was prepared a composite cup (the unit weight was 0.039 g/ml) comprising the outer member (the above-mentioned paper cup) and the inner member composed of the inner pouch prepared from the 5-layer sheet including the intermediate layer composed of the three-component mixture, in which the contact faces of the two members were bonded together throughout the cup (hereinafter referred to as "B"). The adhesion strength was measured at the curl portion of the opening and the barrel wall portion according to the above-mentioned method. The obtained results are shown in Table 3.

The following 8 composite cups, that is, the above-mentioned composite cups A and B, the composite cups comprising the remaining 5 kinds of the 5-layer inner pouches, respectively and the composite cup comprising the single-layer inner member (PO) composed solely of the above-mentioned polyolefin mixture, were tested in the following manner. Namely, 230 ml of an orange juice having an orange concentration of 50% was hot-filled in the composite cup at 82° C., and just after the hot filling, the lid described in Example 1 was heat-sealed to the opening of the filled cup at 150° C. by an iron. The filled cup was air-cooled to 25° C. and was stored at 25° C. for 2 months (in the bright place in a room). After 2 months' storage, the deformation state of each cup was examined. No deformation was observed in any of the composite cup A in which the outer and inner members were bonded together only at the curl portion of the opening, the composite cups comprising the other 5 kinds of the 5-layer inner pouches and the composite cup comprising the inner pouch of PO. In contrast, extreme cavity deformation was caused in the composite cup B in which the outer and inner members were bonded together through the entire contact surfaces.

The b value of each of the orange juice stored at 25° C. for 1 month in the state contained in the above-mentioned 8 kinds of the composite cups was measured by a color difference meter. The obtained results are shown in Table 4. Incidentally, also the b value of the orange juice contained in a glass bottle as a control is shown in Table 4. From the results shown in Table 4, it is seen that since the blend resin layer of the ethylene-vinyl alcohol copolymers and 6,66 copolymer nylon in the inner member effectively acted as the oxygen-barrier layer, the discoloration of the orange juice was controlled to a very low level and especially, the composite cups A and B showed a preservability comparable to that of the glass bottle, while in the composite cup comprising the inner member of PO having no intermediate barrier layer of the above-mentioned blend, the orange juice was apparently discolored. It also is seen that in the composite cups having the 5-layer inner member including the intermediate layer composed solely of N1, A or B1, discoloration of the orange juice was prominent because pinholes or cracks were formed in the intermediate layer when the 5-layer sheet was formed into the inner pouch according to the above-mentioned method.

With respect to the inner member of the composite cup A, the three-dimensional birefrigences $\Delta x$, $\Delta y$ and $\Delta z$ of the inner member corresponding to the extrusion direction (MD) and transverse direction (TD) of the sheet were measured at a portion 1 to 2 cm below the opening (curl portion) by using a polarization microscope (Model POH supplied by Nippon Kogaku Kogyo K.K.). The obtained results are $\Delta x = 2.94 \times 10^{-3}$, $\Delta y = 2.53 \times 10^{-3}$ and $\Delta z = 0.412 \times 10^{-3}$ in the direction MD and $\Delta x = 2.34 \times 10^{-3}$, $\Delta y = 2.46 \times 10^{-3}$ and $\Delta z = 0.122 \times 10^{-3}$ in the direction TD. Accordingly, it was found that the inner member was highly molecularly oriented in the axial direction (the direction of the height) of the inner pouch. Incidentally, the three-dimensional birefringences $\Delta x$, $\Delta y$ and $\Delta z$ are defined as $\Delta x = nz - ny$, $\Delta y = nz - nx$ and $\Delta z = nx - ny$, respectively, wherein nz, ny and nx stand for the refractive indexes of the inner pouch in the axial direction (the direction of the height), the circumferential direction and the thickness direction, respectively.

TABLE 3

| Sample | Adhesion Strength (Kg/15 mm of width) | |
|---|---|---|
| | Curling Part of Opening | Barrel Wall Portion |
| Composite Cup A | 0.9 | 0 |
| Composite Cup B | 0.8 | 0.7 |

TABLE 4

| Sample | Mixing Ratio [N1/(A + B1)] of Intermediate Layer of Inner Member | b Value after 2 Months' Storage at 25° C. | Deformation Due to Pressure Reduction after 2 Months' Storage at 25° C. | Remarks |
| --- | --- | --- | --- | --- |
| — | 100/(0 + 0) | 25.1 | no deformation | comparison |
| — | 50/(50 + 0) | 42.0 | no deformation | present invention |
| composite cup A[1] | 50/(25 + 25) | 44.9 | no deformation | present invention |
| composite cup B[2] | 50/(25 + 25) | 44.8 | large deformation | comparison |
| — | 50/(0 + 50) | 41.5 | no deformation | present invention |
| — | 0/(100 + 0) | 26.3 | no deformation | comparison |
| — | 0/(0 + 100) | 25.6 | no deformation | comparison |
| composite cup PO[3] | no intermediate layer | 14.7 | no deformation | comparison |
| glass bottle | — | 50.3 | — | control |

Note
[1]Composite cup in which only the curl portion of the opening was bonded.
[2]Composite cup in which the curl portion of the opening and the entire barrel wall portion were bonded.
[3]Composite cup comprising the inner member of the single layer of the blend of isotactic polypropylene and high density polyethylene.
[4]The b value just after filling was 50.4.

EXAMPLE 4

Twelve kinds of three-layer laminate sheets were prepared through a 3-ply die by using a polyolefin outer layer extruder provided with a full-flighted screw having a diameter of 65 mm and an effective length of 1430 mm, an intermediate layer (adhesive layer) extruder provided with a full-flighted screw having a diameter of 50 mm and an effective length of 1100 mm and a barrier layer extruder provided with a full-flighted screw having a diameter of 50 mm and an effective length of 1100 mm. A blend comprising high density polyethylene having a melt index of 0.3 g/10 min (ASTM D-1238), a density of 0.95 g/cc (ASTM D-1505) and a melting point of 141° C. (DTA method) and isotactic polypropylene having a melt index of 5.0 g/10 min, a density of 0.91 g/cc and a melting point of 160° C. (DTA method) at a weight ratio of 30/70 was used as the polyolefin, and maleic anhydridemodified high density polyethylene (H-31B supplied by Mitsubishi Petrochemical Co.) was used as the adhesive. As the gas-barrier resin, the following 12 resins were independently used.
(i) 6,66 Copolymer nylon (N1) described in Example 1.
(ii) Ethylene-vinyl alcohol copolymer (A) described in Example 1.
(iii) Ethylene-vinyl alcohol copolymer (B1) described in Example 1.
(iv) 80/20 Weight ratio two-component blend of N1 and A.
(v) 50/50 Weight ratio two-component blend of N1 and A.
(vi) 20/80 Weight ratio two-component blend of N1 and A.
(vii) 80/20 Weight ratio two-component blend of N1 and B1.
(viii) 50/50 Weight ratio two-component blend of N1 and B1.
(ix) 80/20 Weight ratio two-component blend of N1 and B1.
(x) Three-component blend in which N1/(A+B1) weight ratio was 80/(10+10).
(xi) Three-component blend in which N1/(A+B1) weight ratio was 50/(25+25).
(xii) Three-component blend in which N1/(A+B1) weight ratio was 20/(40+40).

In each of the so-obtained 3-layer sheets, the width was 200 mm, the total thickness was 0.3 mm, and the polyolefin layer/adhesive layer/barrier layer thickness ratio was 20/0.5/1.

The barrier layer side of each sheet was coated with a polyvinylidene resin latex (dispersion medium = water; solid concentration = 47% by weight) comprising 83% by weight of vinylidene chloride, 14% by weight of methoxyethylmethyl acrylate and 3% by weight of methyl acrylate and further containing ethylene trichloride in an amount of 40 parts by weight per 100 parts by weight of the foregoing three monomers according to the known bar coater method, and the coated sheet was heated at 70° C. for 5 minutes in a perfect oven (air circulation type) and then aged (heat-treated) at 80° C. for 4 minutes in an air thermostat tank. The average thickness of the polyvinylidene resin layer after drying and aging was $5.2\mu$ in each sheet. The oxygen permeation coefficient of this polyvinylidene chloride resin was $1.5 \times 10^{-14}$ cc.cm/cm$^2$.sec.cmHg as measured at a temperature of 20° C. and a relative humidity of 100%, and the water vapor permeation coefficient was $0.96 \times 10^{-3}$ g.cm/m$^2$.day (JIS Z-0208).

A square cup-shaped outer member composed of a cup paper having a basis weight of 300 g/m$^2$ and a thickness of 0.323 mm, which had an opening size (D) of 65 mm×65 mm and a total height (H) of 90 mm (H/D = 1.38) and had a flange portion on the opening, was set in a mold, and an aqueous emulsion (having a solid concentration of 30% by weight) of high density polyethylene having 3% by weight of maleic anhydride grafted thereto (having a melting point of 133° C.) was coated as an adhesive on the flange portion by an applicator supplied by Nordson Co., USA.

Each of the above-mentioned 12 laminate sheets was heated at a thermolabel temperature of 148° to 153° C. for 10 seconds and forced into the mold in which the cup-shaped outer member (female mold) had been set, and the plug-assist vacuum pressure forming was carried out. Simultaneously, the emulsion coated on the flange portion was dried and the sheet was bonded to the outer member. Thus, there were obtained 12 kinds of composite cups (the unit weight was 0.022 g/ml) comprising the outer member composed of the above-mentioned cup paper and the inner pouch composed of any of the above-mentioned 12 laminate sheets, in which the inner pouch was bonded to the outer member only at the flange portion of the opening. In each composite cup, the polyolefin mixture layer of the inner member was located on the side of the paper substrate (cup-shaped paper) and the polyvinylidene chloride resin layer was located on the inner face side, and the average total thickness of the inner member was 0.1 mm. With respect to the composite cup (hereinafter referred to as "C") having the inner pouch prepared from the laminate sheet comprising the barrier layer (xi), the adhesion strength between the outer member and inner member at the flange portion of the opening and the barrel wall portion was measured at room temperature by a tensile tester (at room temperature and a pulling speed of 200 mm/min). The obtained results are shown in Table 5.

For comparison, the aqueous emulsion of the above-mentioned maleic anhydride-grafted high density polyethylene was coated on the flange portion of the opening and the entire inner face portion of the cup-shaped outer member set in the mold, and in the same manner as described above, with the same conditions, material structures and thickness as described above, there was prepared a composite cup (the unit weight was 0.023 g/ml; hereinafter referred to as "D"), in which the outer member (paper cup) and the inner member (the same inner cup as that of the above-mentioned composite cup C) were bonded together along the contact surfaces throughout the cup. The adhesion strength at the flange portion of the opening and the barrel wall portion was measured according to the above-mentioned method. The obtained results are shown in Table 5.

Each of the composite cups C and D was filled with 350 ml of city water, and the opening of each composite cup was heat-sealed at 170° C. by an iron with the same lid as used in Example 1, that is, a lid composed of a three-layer film comprising a heat-sealant layer (30μ in thickness) composed of a mixture comprising 90% by weight of an ethylene-vinyl acetate copolymer having a vinyl acetate content of 20% by weight and a melting point of 92° C. and 10% by weight of a vinyl aromatic polymer having a hydrogenation ratio of 100% (Arkon P supplied by Arakawa Kagaku Kogyo K.K.), an intermediate layer of low density polyethylene having a thickness of 15μ and an outer layer of an aluminum foil having a thickness of 30μ. Then, each composite cup was stored at 25° C. for 6 months. After 6 months, no deformation was caused in the cups C and D, and the shape-retaining property of each cup was excellent.

When the lids heat-sealed to the openings of the cups C and D were opening by peeling, the opening could be accomplished very smoothly without dusting in each of the cups C and D, and no sealing member was left on the openings of the cups after the opening. Thus, it was confirmed that each cup was excellent in the easy openability.

The above-mentioned composite cups C and D, composite cups comprising inner pouches (inner members) composed of other 11 laminate sheets, respectively, and a comparative composite cup comprising a single-layer inner member composed solely of the above-mentioned polyolefin mixture, in which the inner member and outer member were bonded together along the contact surfaces through the entire cup by the above-mentioned maleic anhydride-modified high density polyethylene (the unit weight was 0.022 g/ml; hereinafter referred to as "E"), were tested in the following manner. More specifically, 380 ml of an orange juice having an orange concentration of 50% was hot-filled at 82° C. in each cup, and the above-mentioned lid was heat-sealed at 170° C. by an iron. The sealed cup was air-dried to 25° C. and was stored at 25° C. for 2 months (in the bright place in a room). The deformation state of each cup was examined after 2 months. No deformation was observed in any of the composite cup C in which the outer and inner members were bonded only at the flange portion of the opening and the composite cups comprising the inner pouches composed of other 11 laminate sheets, respectively, but extreme cavity deformation was observed in the composite cups (D and E) in which the outer and inner members were bonded together through the entire contact surfaces. Thus, it was confirmed that the composite cup C and other 11 composite cups were excellent in the resistance to the deformation due to reduction of the pressure.

The b values of the orange juices contained in the above-mentioned 14 composite cups and stored at 25° C. for 1 month were measured by a color difference meter. The obtained results are shown in Table 6. Also the results obtained with respect to the orange juice contained in a glass bottle as a control are shown in Table 6. From the results shown in Table 6, it is seen that since the layer of the blend of the ethylene-vinyl alcohol copolymer and 6,66 copolymer nylon and the polyvinylidene chloride resin layer in the inner member acted effectively as oxygen-barrier layers, discoloration of the orange juice was controlled to a very low level and especially, the composite cups C and D had a preservability comparable to that of the glass bottle, while in the composite cup E free of the barrier resin layer, the juice was apparently discolored. It also is seen that in the composite cups in which the barrier layer of the inner member was composed solely of the 6,66 copolymer nylon N1 (i), the ethylene-vinyl alcohol copolymer A (ii) or the ethylene-vinyl alcohol copolymer B1 (iii), pinholes or cracks were formed in the layers (i), (ii) and (iii) when the laminate sheets were formed into the pouches and therefore, discoloration of the juice was prominent.

Each of the composite cups C, D and E was filled with 280 ml of refined sake (first class) maintained at 50° C., and the opening of each cup was sealed just after filling and the deformation state of each composite cup was examined after 5 hours. No deformation was caused in the composite cup C, while prominent deformation was caused in the composite cups D and E.

The composite cups C and E filled with sake were allowed to stand still at room temperature (25° C.) for 3 weeks, and the sake stored in each cup was subjected to the organoleptic examination by 21 experts to check the taste, bouquet and flavor. Among 21 experts, 18 experts answered that sake filled in the composite cup C was better, one expert answered that sake filled in the composite cup E was better, and the remaining two experts answered that there was no difference.

TABLE 5

| Sample | Adhesion Strength (Kg/15 mm of Width) | |
|---|---|---|
| | Flange Portion of Opening | Barrel Wall Portion |
| Composite Cup C | 1.1 | 0 |
| Composite Cup D | 1.1 | 0.8 |
| Composite Cup E | 1.0 | 0.7 |

TABLE 6

| Sample | Mixing Ratio in Barrier Layer in Inner Member | b Value after 2 Months' Storage at 25° C. | Deformation Due to Pressure Reduction after 2 Months' Storage at 25° C. | Remarks |
| --- | --- | --- | --- | --- |
|  | (i) | 30.8 | no deformation | comparison |
|  | (ii) | 31.1 | no deformation | comparison |
|  | (iii) | 32.7 | no deformation | comparison |
|  | (iv) | 42.0 | no deformation | present invention |
|  | (v) | 45.5 | no deformation | present invention |
|  | (vi) | 44.5 | no deformation | present invention |
|  | (vii) | 41.9 | no deformation | present invention |
|  | (viii) | 45.2 | no deformation | present invention |
|  | (ix) | 43.6 | no deformation | present invention |
|  | (x) | 47.5 | no deformation | present invention |
| composite cup C[1] | (xi) | 50.3 | no deformation | present invention |
| composite cup D[2] | (xi) | 50.2 | large deformation | comparison |
|  | (xii) | 49.4 | no deformation | present invention |
| composite cup E[3] | no barrier layer | 15.1 | large deformation | comparison |
| glass bottle | — | 50.3 | — | control |

Note
[1]Composite cup in which inner and outer members were bonded together only at the flange portion of the opening.
[2]Composite cup in which inner and outer members were bonded together at the flange portion of the opening and the entire barrel wall portion.
[3]Composite cup comprising the inner member composed solely of the single layer of the blend of isotactic polypropylene and high density polyethylene.
[4]The b value just after filling was 50.4.

EXAMPLE 5

One surface of a sheet obtained by melt-extruding a mixture comprising 70% by weight of high density polyethylene (having a melting point of 137° C.) and 30% by weight of isotactic polypropylene (having a melting point of 162° C.), which had a thickness of 0.3 mm, was treated with an isocyanate type anchoring agent, and a solution of vinylidene chloride resin comprising 90% by weight of vinylidene chloride and 10% by weight of acrylonitrile (1/1 liquid mixture of THF and toluene was used as the solvent and the concentration was 30% by weight) was coated and dried on the treated surface of the sheet to obtain a two-layer laminate sheet comprising a layer of the polyolefin mixture (0.3 mm in thickness) and a layer of the vinylidene chloride resin (0.01 mm in thickness).

A cylindrical cup-shaped outer member composed of a cup paper having a basis weight of 300 g/m² and a thickness of 0.323 mm, which had an opening inner diameter of 65 mm and a total height of 70 mm and had a curl portion on the opening, was set in a mold, and an aqueous emulsion (the solid concentration was 30% by weight) of high density polyethylene having 3% by weight of maleic anhydride grafted thereto (the melting point was 133° C.) was coated only on the curl portion by using an applicator supplied by Nordson Co., USA.

The two-layer laminate sheet was heated at a thermolabel temperature of 143° to 148° C. for 10 seconds by an infrared ray heater, and the sheet was forced into the mold in which the cup-shaped outer member (female mold) and the plug-assist vacuum pressure forming curried out. Simultaneously, the emulsion coated on the curl portion of the outer member was dried and bonded to the sheet, to obtain a composite cup (the unit weight was 0.038 g/ml) comprising the outer member composed of the cup paper and the inner member of the two-layer laminate film, in which both the inner and outer members were bonded together only at the curl portion of the opening. The polyolefin mixture layer of the inner member was located on the side of the paper substrate (cup-shaped paper), and the polyvinylidene chloride resin layer was located on the inner face side. The average entire thickness of the inner member was 0.1 mm. The adhesion strength between the outer member and inner member was measured at the curl portion of the opening and the barrel wall portion at room temperature by using a tensile tester. The obtained results are shown in Table 7. This composite cup is designated as "composite cup A".

For comparison, the aqueous emulsion of the above-mentioned maleic anhydride-grafted high density polyethylene was coated on the curl portion of the opening and the entire inner face of the above-mentioned cup-shaped outer member set in the mold, and in the same manner as described above, with the same conditions, material structures and thickness, a composite cup (the unit weight was 0.039 g/ml) (hereinafter referred to as "composite cup B") in which the outer member (the cup-shaped paper) and the inner member (the two-layer sheet) were bonded together along the entire contact surfaces was obtained. The adhesion strength at the curl portion of the opening and the barrel wall portion was measured according to the above-mentioned method. The obtained results are shown in Table 7.

Each of the composite cups A and B was filled with 180 ml of city water maintained at 20° C. and the opening was heat-sealed at 150° C. by an iron with a lid composed of a three-layer film having a heat-sealant layer (30μ in thickness) composed of a mixture comprising 90% by weight of an ethylene-vinyl alcohol copolymer having a vinyl acetate content of 20% by weight and a melting point of 92° C. and 10% by weight of a vinyl aromatic polymer having a hydrogenation ratio of 100% (Arkon P supplied by Arakawa Kagaku Kogyo), an intermediate layer (15μ in thickness) composed of low density polyethylene and an outer layer composed of an aluminum foil having a thickness of 30μ. Then, the filled composite cups were stored at 25° C. for 6 months. After 6 months' storage, no deformation was caused in the cups A and B, and it was confirmed that both the cups A and B were excellent in the shape-retaining property.

When both the cups were opened by peeling the lids heat-sealed on the opening of the cups, the opening could be performed very smoothly without dusting in each of the cups A and B and no sealing material was left on the opening of each cup. Thus, it was confirmed that both the cups A and B were excellent in the easy openability.

The above-mentioned composite cups A and B and a comparative composite cup (the unit weight was 0.036 g/ml; hereinafter referred to as "composite cup C") in which the inner member was composed of a single layer sheet of the above-mentioned polyolefin mixture and both the inner member and outer member were bonded together through the entire contact surfaces by the above-mentioned maleic anhydride-modified high density polyethylene were tested in the following manner. Namely, 180 ml of an orange juice having an orange concentration of 50% was hot-filled at 82° C. in each cup, and the cup was heat-sealed at 150° C. with the above-mentioned lid by an iron. The cup was air-cooled to 25° C. and stored at 25° C. for 1 month. After 1 month's storage, the deformation state of each cup was examined. In the composite cup A where the outer and inner members were bonded together only on the curl portion, no deformation was caused, but in the composite cups B and C where the outer and inner members were bonded together through the entire contact surfaces, extreme cavity deformation was observed. Thus, it was confirmed that the composite cup A was excellent in the resistance to the deformation due to reduction of the pressure.

The b values of the orange juices contained in the composite cups A, B and C and stored at 25° C. for 1 month were measured by a color difference meter. The obtained results are shown in Table 8. For comparison, the data of the orange juice contained and stored in a glass bottle as a control are shown in Table 8. From the results shown in Table 8, it is seen that since the polyvinylidene chloride resin layer in the inner member acted as the oxygen-barrier layer effectively, the discoloration of the orange juice was controlled to a very low level in the composite cups A and B and these cups had a preservability comparable to that of the glass bottle, while in the composite cup C free of the polyvinylidene chloride resin layer, the orange juice was apparently discolored.

Each of the composite cups A and B was filled with 150 ml of refined sake (first glass) maintained at 50° C., and just after filling, the opening of each cup was heat-sealed with the above-mentioned lid. The filled cups were allowed to stand still for 5 hours and the deformation state was examined. In the composite cup A, no deformation was caused, but apparent cavity deformation was caused in the composite cup B.

TABLE 7

| Sample | Adhesion Strength (Kg/15 mm of width) | |
|---|---|---|
| | Curl Portion of Opening | Barrel Wall Portion |
| Composite cup A | 0.7 | 0 |
| Composite cup B | 0.7 | 0.6 |

TABLE 8

| Sample | b Value after 1 Month at 25° C.* | Deformation Due to Reduction of Pressure after 1 Month at 25° C. | Remarks |
|---|---|---|---|
| Composite cut A | 49.7 | no deformation | present invention |
| Composite cup B | 49.2 | large deformation | comparison |
| Composite cup C | 28.9 | large deformation | comparison |
| Glass bottle | 49.8 | — | control |

Note:
*The b value just after filling was 50.2.

What is claimed is:

1. A function-separated composite vessel excellent in the easy openability, preservability and resistance to the deformation due to reduction of the pressure, which comprises (1) a cup-shaped outer member composed of a paper substrate and having a barrel portion, a bottom portion bonded to the lower end of the barrel portion and a curl or flange portion formed on an upper end opening of the barrel portion, said bottom portion being formed of a paper sheet having an air permeability, and (2) a flexible seamless cup-shaped inner member composed of a gas-barrier plastic material, said inner member being formed by plug-assist-forming a film of the gas-barrier plastic material within the outer member as a female mold until the film is substantially exactly fitted in the inner side of the outer member and an opening of the inner member is bonded only to the curl portion or flange portion of the outer member, whereby when the vessel is hot-filled, the opening of the vessel sealed and the filled contents allowed to cool, deformation of the configuration of the cup-shaped outer member caused by reduction of the inner pressure in the sealed vessel due to decrease of the volume of the content and condensation of vapors is substantially avoided.

2. A composite vessel as set forth in claim 1, wherein the seamless cup-shaped inner member is composed of a film or sheet comprising a substrate containing crystalline polypropylene and polyethylene at a weight ratio of from 90/10 to 5/95 and a gas-barrier resin layer formed on the substrate by lamination or coating.

3. A composite vessel as set forth in claim 1, wherein the opening of the inner member is bonded to the curl portion or flange portion of the outer member through a hot-melt adhesive composed of an acid- or acid anhydride-modified olefin resin or a blend of an olefin resin and a tackifier.

4. A composite vessel excellent in the preservability, which comprises a cup-shaped outer member having a curl or flange portion at the open end thereof and composed of a paper substrate having a gas permeability and a flexible seamless cup-shaped inner member having a layer of a blend comprising an ethylene-vinyl alcohol copolymer and a polyamide at a weight ratio of from 95/5 to 5/95, wherein the cup-shaped inner member has such a size that the inner member is substantially exactly fitted in the inner side of the outer member and an opening of the inner member is bonded only to the curl or flange portion of the outer member, the inner member is draw-formed so that the draw ratio H/D defined as the ratio of the height H of the inner member to the size D of the opening of the inner member is at least 0.5, and the cup wall of the inner member is molecularly oriented.

5. A composite vessel as set forth in claim 4, wherein the ethylene-vinyl alcohol copolymer is a blend comprising (A) a saponfied ethylene-vinyl ester copolymer having an ethylene content of 20 to 55 mole % and a saponification degree of at least 95% and (B) a saponified ethylene-vinyl ester copolymer having an ethylene content of 25 to 60 mole %, which is higher by at least 3 mole % than the ethylene content of said saponified ethylene-vinyl ester copolymer (A), and a saponification degree of at least 90%, at an (A)/(B) weight ratio of from 90/10 to 10/90.

6. A composite vessel as set forth in claim 5, wherein the saponified copolymer (A) is a saponified ethylene-vinyl ester copolymer having an ethylene content of 25 to 50 mole % and the saponified copolymer (B) is a saponified ethylene-vinyl ester copolymer having an ethylene content of 30 to 55 mole %, which is higher by at least 5 mole % than the ethylene content of the saponified copolymer (A).

7. A composite vessel as set forth in claim 4 or 5, wherein the polyamide is a homopolyamide or copolyamide having 4 to 30 amide groups per 100 carbon atoms in the polyamide, or a blend thereof.

8. A composite vessel as set forth in claim 4 or 5, wherein the polyamide is a copolyamide comprising nylon 6 and nylon 6,6 at a weight ratio of from 99/1 to 70/30.

9. A composite vessel as set forth in claim 5, wherein the blend comprises the saponified copolymer (A) and the saponified copolymer (B) at a weight ratio of from 80/20 to 20/80.

10. A composite vessel as set forth in claim 4, wherein the blend comprises the ethylene-vinyl alcohol copolymer and the polyamide at a weight ratio of from 80/20 to 5/95.

11. A composite vessel as set forth in claim 4, wherein the cup-shaped inner member is composed of a laminate comprising at least one layer of the blend of the ethylene-vinyl alcohol copolymer and the polyamide and at least one layer composed of a polyolefin.

12. A composite vessel as set forth in claim 11, wherein the laminate comprises outer and inner surface layers composed of the polyolefin and an intermediate layer composed of said blend.

13. A composite vessel as set forth in claim 4, wherein the cup-shaped inner member is composed of a laminate comprising a layer of the blend of the ethylene-vinyl alcohol copolymer and the polyamide, a polyolefin layer formed on the outer side of said blend layer and a vinylidene chloride resin layer formed on the inner side of said blend layer.

14. A composite vessel as set forth in claim 11, 12 or 13, wherein the polyolefin is a polyolefin blend comprising crystalline polypropylene and polyethylene at a weight ratio of from 90/10 to 5/95.

15. A process for the preparation of composite vessels excellent in the preservability, which comprises supplying a flexible film or sheet having a layer of a blend comprising an ethylene-vinyl alcohol copolymer and a polyamide at a weight ratio of from 95/5 to 5/95 to the vicinity of an opening of a cup-shaped outer member composed of a paper substrate having a gas permeability and plug-assist-forming the film or sheet with said outer member being as a female mold until the film or sheet is substantially exactly fitted in the inner side of the outer member and bonding said shaped film or sheet to said outer member only in the vicinity of the opening thereof.

16. A composite vessel as set forth in claim 1, wherein the paper substrate has a basis weight of 50 to 400 g/m².

17. A composite vessel according to claim 16, wherein the cup-shaped inner member has a unit weight of from 0.001 to 0.5 gram per milliliter of the volume occupied by said inner member.

* * * * *